Sept. 28, 1965       B. LASSMAN        3,209,057
PRESSURE MOLDING OF DRY MATERIAL
Filed June 4, 1962                 2 Sheets-Sheet 1
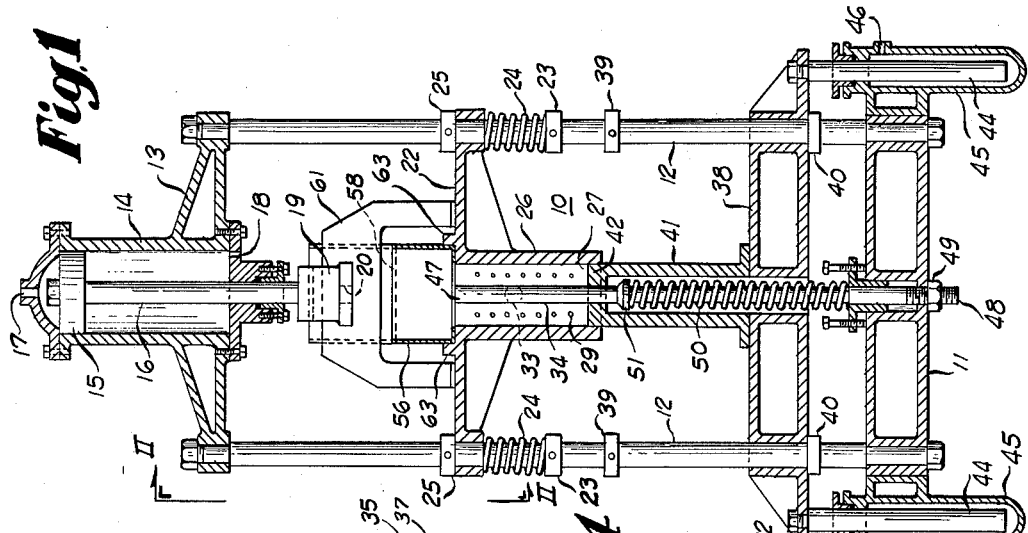
INVENTOR
BENJAMIN LASSMAN
Attorneys
BY HOOPES, LEONARD & BUELL

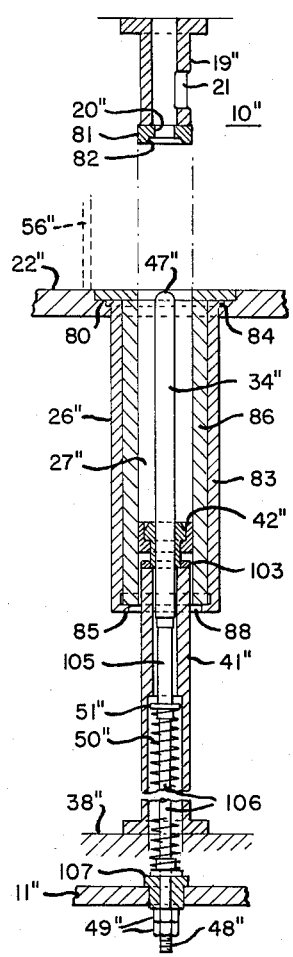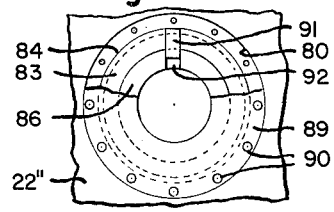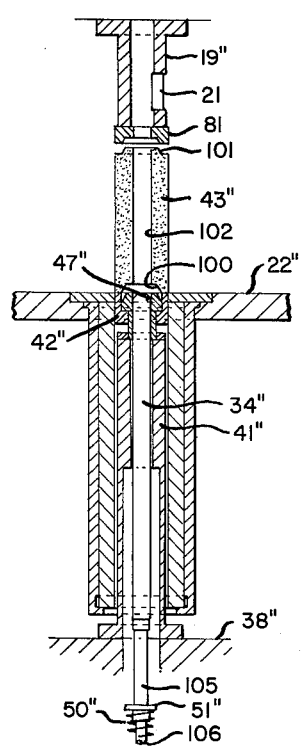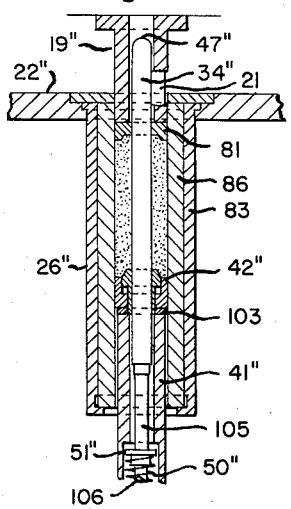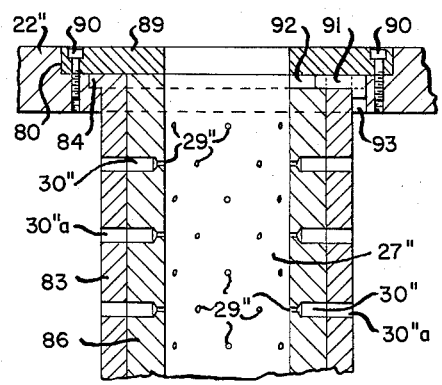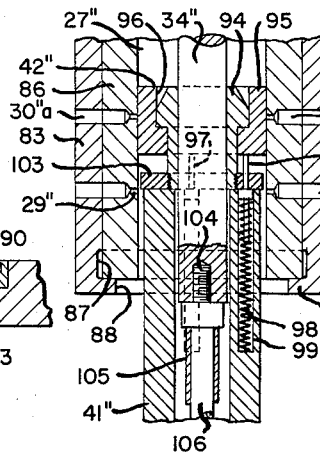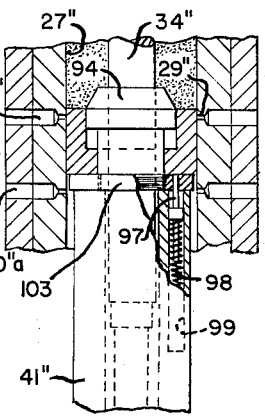
INVENTOR
Benjamin Lassman United States Patent Office 3,209,057
Patented Sept. 28, 1965

3,209,057
PRESSURE MOLDING OF DRY MATERIAL
Benjamin Lassman, Pittsburgh, Pa., assignor to Benjamin Lassman & Son, Glenshaw, Pa., a Pennsylvania partnership
Filed June 4, 1962, Ser. No. 203,682
4 Claims. (Cl. 264—109)

This invention is an improvement upon my earlier invention disclosed in my United States Patent No. 2,209,404 and an in-part continuation of my copending application S.N. 838,641 filed September 8, 1959, and now abandoned in favor of this application.

This invention relates to pressure molding of relatively dry materials of ceramic and other moldable materials in mixed or unmixed state, as the case may be. More particularly, this invention relates to apparatus and method for dry pressing to form hollow or indented shapes of clay, refractory, plastic and other suitable molding materials in which the charging and cycle time is relatively short and the product of high and uniform quality.

Devices made in accordance with this invention provide a way for hollow or indented shapes or pipes, for example, to be made relatively rapidly at lessened cost from relatively dry moldable materials in nodule or granular form as a general rule. Moreover, the charging of such materials is an integrated part of my new apparatus and guide which inhibits entrapment of air, a common troublesome element in such cases, and provides a high quality, uniform product substantially free from relatively weak or uneven portions even when the molded shape is somewhat irregular. Thus, in the manufacture of metal pouring refractories for directionally conveying molten metal to an ingot or other molds, it is important to have the molded material without air pockets or defects therein or too greatly varying density which may cause irregular shrinkage, warping, cracking or other cause for the discarding thereof. Automatic or cyclic production further is enhanced by this invention in that the mold filling portion occurs relatively swiftly and evenly even when more than one mandrel may be utilized.

Other objects, features and advantages of this invention will be apparent from the following description and the accompanying drawings, which are illustrative only, in which:

FIGURE 1 is a front view of a press embodiment for the molding of a hollow irregular shape from relatively dry material in accordance with this invention, the parts being shown at the start of an article molding cycle;

FIGURE 2 is a partial view in section taken along line II—II of FIGURE 1 with the embodiment at the end of a molded article producing cycle;

FIGURE 3 is a view like that shown in FIGURE 2 with the embodiment in the course of molding such an article;

FIGURE 4 is an enlarged sectional view of the upper part of the floating mold box shown in the above embodiment;

FIGURE 5 is a perspective view of the article molded in accordance with this invention by the above embodiment;

FIGURE 6 is a detail view in section of a mold box and coring mandrel of a modified embodiment of this invention utilizing a vented coring mandrel;

FIGURE 7 is a partial view, partly in cross section, of a further embodiment of this invention providing novel mold box means;

FIGURE 8 is a view of such further embodiment in mold compaction position;

FIGURE 9 is a view of such further embodiment in molded article discharge position;

FIGURE 10 is a plan view, partly broken away, of the top of the mold box of such further embodiment;

FIGURE 11 is a detail view in elevation and cross section of the upper portion of such mold box of such further embodiment;

FIGURE 12 is a detail view of the lower portion of the mold box means shown in FIGURE 7 inclusive of parts forming the bottom thereof; and FIGURE 13 is a detail view similar to that shown in FIGURE 12 but showing the bottom of the mold cavity subjected to compaction pressure by material being molded pursuant to FIGURE 8.

Referring to the drawings, showing a press 10, there is therein a fixed base 11 to which upwardly extending parallel columns 12 are affixed. The upper ends of the columns 12 are connected by a cross yoke 13 supporting a double acting hydraulic cylinder 14 having a piston 15 and piston rod 16 to be reciprocated in accordance with the flow of hydraulic liquid through the respective ports 17 and 18 at the respective intervals therefor in the timing of an operative cycle. A compacting plunger 19 is rigidly connected to the lower end of rod 16 and is provided with a central opening 20 and lateral openings 21.

A molding platen 22 is resiliently supported on columns 12 by collars 23 and springs 24. Collars 25 limit the upward extend of movement of the platen 22. A floating mold box 26 is provided as a part of platen 22, integrally or connected thereto as may be desired. The collars 23 and 25 may be adjustably fastened to the columns 12 to accommodate mold boxes of different designs or sizes to be used on press 10.

As shown, the mold box is provided with a mold cavity 27 which is rectangular and the vertical front and back walls 28 thereof are provided with relatively small vents 29 normal to those surfaces. The outer ends 30 of the vents farther from mold cavity 27 preferably are of a diameter several times as large as the inner ends of the vents 29. In the illustrated embodiment, the back wall 28 is also provided with a drilled boss 31 to supportably guide a side mandrel 32 reciprocable therein. The outer end of side mandrel 32 is affixed to a piston 35 adapted to reciprocate in a double-acting cylinder 36 having a suitable packing gland 37a in the rod end thereof and respective ports 37 on the two sides of piston 35. Cylinder 36 is rigidly secured to platen 22 in alignment with the opening through boss 31.

The inner end of mandrel 32 is provided with a vertically extending recess 33 in the form of a half moon in plan to seat against a coring mandrel 34 when side mandrel 32 is in its extended position shown in FIGURE 4. Depending upon the shape to be molded, it may be desirable to vent all of the walls of the rectilinear mold box 26, or to vent the mandrel or mandrels extending into mold cavity 27 instead, as where the vents in the mold box walls may tend to mark the exterior surfaces of the molded shape more than may be desired. In still other cases, as where the ware shape to be molded is relatively thick-walled, vents may be provided both in the walls of the mold box and in the mandrel or mandrels.

A lower platen 38 is slidably supported on columns 12 with the range of movement thereof being generally between the upper and lower collars 39 and 40 respectively. Platen 38 is provided with a central vertical opening therethrough and supports a hollow punch 41 having a closed top 42 which serves as the bottom of mold box 26 during the charge filling and molding operation and also as the ejector for a fully molded article of ware 43 when molding thereof is complete in press 10. Such ejection occurs when plungers 44 are extended by the introduction of hydraulic liquid to the interior of single-acting ejector cylinders 45 through the respective ports 46 in each at the proper time.

Coring mandrel 34 has its upper end 47 normally in alignment with the top of the mold box 26, extends downwardly through an opening therefor in top 42 of punch 41 and terminates in a threaded end 48 so that the height of mandrel 34 may be adjusted by a nut 49 held against the bottom of base 11 by a spring 50 which extends between base 11 and a flange 51 on mandrel 34 within punch 41.

The filling of cavity 27 is performed in the illustrated embodiment through the medium of a charging assembly 52 mounted on a table 53 at a fixed height level with the top of platen 22 in its uppermost position. A double-acting cylinder 54 has a reciprocable piston rod 55 connected to a feed slide box 56 open at its top and bottom with the bottom opening 57 thereof substantially corresponding in area and shape to the area and shape of a horizontal section through cavity 27. A closure plate 58 at the level of the top of box 56 extends to one side toward cylinder 54 so that when box 56 is in its advanced position, as shown in FIGURE 2, it will close the bottom of a hopper 59 kept supplied with granular moldable material by a feed pipe 60. Hopper 59 is fixed in elevated position to table 53 by arches 61. The longitudinally extending edges of closure plate 58 are provided with depending skirts 62 the bottom edges of which ride on table 53 between guides which are in registry with lateral guides 63 on platen 22 when that platen is in the position shown in FIGURE 1.

In operation, let it be assumed that parts of the illustrated embodiment are in a position shown in FIGURE 2 with mold cavity 27 being filled in the relatively small interval of time that opening 57 overlaps the top of cavity 27. During such filling, granulated particles to be molded tumble and roll beneath and around the projecting portion of side mandrel 32 and surround it with the molding material reaching the top of cavity 27 by the time that slide box 56 returns to its retracted position shown in FIGURE 3. As the material to be molded fills cavity 27, it will do so quickly and the formation of voids and gaps in the material is avoided because air is so quickly vented through the vents 29 without loss of solid material therethrough because of the relatively small size of the openings 29 since the vents are so disposed that the smaller cross-section thereof opens toward the mold cavity, this portion being small enough in size as to preclude any ready flow therethrough of the molding material, including fines, during filling of said mold box. During such filling, further, any fragments of moldable material remaining in the smaller portion of the vents 29 from a prior cycle of operations will be blown out by the pressure caused by the falling material pouring into cavity 27.

During such extension of box 56, the closure 58 shuts the bottom of hopper 59. The completion of the retraction of box 56 actuates a limit switch 64, of a kind which is provided with two circuits alternately responsive upon engagement thereof by gate 58 as shown in FIGURE 3. Such actuation of switch 64 causes plunger 19 to move downwardly to compress the moldable material in cavity 27 as shown in FIGURE 3 to form a unitary finally molded shape 43 illustrated in FIGURE 5, the extent of the descent of plunger 19 being selectively determinable by a pressure switch operatively connected to the head end pressure of cylinder 14. Upon reaching the preselected pressure, such pressure switch causes the retraction of side mandrel 32 to its solid line position illustrated in FIGURE 4 and that in turn by means of a further limit switch actuates the cylinders 45 to move punch 41 upwardly until the molded block 43 is on a level with the top of platen 22 which in the meantime has returned to its uppermost position, shown by dot-and-dash lines in FIGURE 3.

As the punch 41 rises, it will shear off any fragments of molded material extending into vents 29 and break any bond between those fragments and the respective vents, thereby providing a freshly molded product 43 with smooth outer vertical sides in the shape of mold box 26.

Upon punch 41 reaching its uppermost position, another limit switch is actuated to energize a second advance and return movement of box 56 to push the freshly molded block 43 off to the other side on platen 22 to a position shown in FIGURE 2 from whence it may conveniently be removed. No material entering cavity 27 during this last-mentioned stroke of box 56 because of the closure of the cavity by the presence therein of punch 41, the top 42 being level with the top of platen 22. The second return of box 56 actuates the alternate circuit in limit switch 64 which deenergizes the cylinders 45 so that punch 41 quickly drops to its lowest position shown in FIGURES 1 and 2 and that in turn causes side mandrel 32 to be extended into the empty cavity 27 into engagement with core mandrel 34 which in turn actuates a further switch to energize the new two-stroke actuation of cylinder 54 by means of which cavity 27 is filled for the commencement of a new cycle of automatic operation as above described. It will be recognized that other sequences of operation and other actuating means may be employed by those having skill in such matters to whom this invention is disclosed. In the illustrated device, the core mandrel 34 forms the vertical central opening 43a while the side mandrel 32 forms the branch opening 43b shown in the final molded product 43.

In the detail view in FIGURE 6 of a modified embodiment, a mold box 26′ is shown with a punch 41′ defining a mold cavity 27′ and having a coring mandrel 34′, such parts cooperating in the manner of the similarly numbered parts illustrated in the above described press embodiment 10. However, in the modified embodiment of FIGURE 6, the mold box 26′ is cylindrical, or of other desired shape, and is free of vents to minimize any tendency of the mold box wall to mar the exterior surface of a ware shape molded in the cavity 27′. Instead, coring mandrel 34′ is hollow and is provided with small vents 29′ to the hollow interior 29′a thereof, the lower portion 34′a of mandrel 34′ being tubular and hollow through the bottom end thereof so that fragments of moldable material entering the vents 29′ and the interior 29′a will be discharged through the interior of a portion 34′a. If desired, the interior of portion 34′a and interior 29′a may be connected during a molding cycle to a vacuum pump for the removal of any fragments in vents 29′, preferably after the molded shape has been pushed out of cavity 27′.

By means of this invention, relatively deep and relatively narrow hollow molded products may be made, with or without lateral branch openings through the product, by relatively automatic machines. Such products are of relatively uniform density and usable for many purposes including, for example, when made of refractory, use as runners and guides in the conducting of hot metal and other substances.

In the further embodiment illustrated in FIGURES 7 to 13, inclusive, of the drawings, flexibility in operations may be more readily provided in a device of this invention in that the mold box comprises an outer case with a replaceable liner duly registered for venting expressed air plus, if desired, a mold box bottom capable of shaping the bottom surface of the molded ware to be compacted in the press shown in those FIGURES 7 to 13. Thus, in that further embodiment, the illustrated construction molds relatively dry particulate and granular material such as clay into the form of a dry pressed teeming ladle stopper rod sleeve which, for example, may have an outside diameter of five inches, an inside diameter of two inches and be twelve inches long when fully compacted, the height of the mold box itself empty being as much as, say twenty-eight inches, depending upon the material used. By having a replaceable linear, articles of different sizes and dimensions may readily be provided for on the same press. In all devices of this invention, the actual filling of the mold box is virtually instantaneous, being less than one second in the case of the exampled rod sleeve, and occurs because of the immediate venting of the air laterally outwardly from the mold cavity which otherwise would unduly prolong charging time and/or tend to cause voids in the material to be molded; at the same time, the vents remain continuously free of clogging which is inhibited by the relative smallness of the inner ends of the vents and the relatively dry condition of the charging material. Parts in the further embodiment of FIGURES 7 to 13, inclusive, corresponding generally in construction and function to those shown in the first described embodiment shown in FIGURES 1 to 4, inclusive, are provided with the same numerals with the addition of a double prime accent thereto, respectively.

In press 10", a floating molding platen 22" is provided with a circular stepped opening 80 for mold box 26" and a compacting plunger 19" having a face plate 81 removably secured to the lower end thereof with an inverted circular indentation 82 therein to shape the annular top surface of a molded piece 43" produced by press 10" with the parts therein as shown in the drawing. Mold box 26" is provided with a substantially cylindrical outer mold box case portion 83 having an upper external annular flange 84 to fit in the intermediate step of opening 80 and an internal annular flange 85 at the bottom thereof to provide a seat for an interchangeable mold box liner 86 forming a part of mold box 26". A counter recess 87 and an opening 88 through the bottom of case 83 cooperate in providing for precise seating of the bottom of liner 86 on the upper side of flange 85. An annular cover plate 89 fits into opening 80 so that the top of plate 89 is flush with the top of platen 22" and forms a part thereof. Mold box liner 86 is subjected to considerable wear and may readily be removed vertically from case 83, which is also removable if desired, when cover plate 89 is taken away. Cover plate 89 is fastened to the adjoining portion of platen 22" by cap screws 90 which are countersunk so that no portion thereof projects above the top surface of the platen 22".

Mold box liner 86 is provided in a regular pattern around substantially the whole height and periphery thereof with radial vents 29", the inner ends of which are relatively small in diameter and the outer ends 30" of which are relatively larger in diameter, such outer ends 30" being in registry with vent outlet portions 30"a in case 83 which as shown have the same diameter as the larger portions 30". The portions of each vent extending through the wall of liner 86 and case 83 are held in registry by a key 91 which fits into registering radial slots 92 provided both in the top edge of case 83 and of liner 86, the outer downwardly extending end of key 91 being in a recess 93 provided therefor in the side of opening 80 to fix the orientation and registry of all parts of the mold box 26"; and of the mold box itself relative to the adjoining portions of platen 22", which latter is of use in preventing relative movement and maintaining orientation in respect of pressings that may not be circular in plan. The sole movement therefore of mold box 26" in use will be axial, that is, vertical in the illustrated embodiment, due to the float mounting of platen 22". Such float mounting tends to distribute the relative movement of the mold box in respect of the top and bottom of the particles of material in the mold cavity in that a generally horizontal intermediate plane of the uncompacted filling of material in the mold box 26" will have little or no movement relative to such mold box; whereas if the platen 22" did not "float" there would be more movement at one end, such as the top of the material, relative to the other end. Having the "static" portion of the moldable material centrally located between top and bottom is particularly advantageous when there is a side coring mandrel such as illustrated in FIGURE 2 of the above first-described embodiment to insure sound substantially voidless compaction of the moldable material entirely around the side coring mandrel particularly.

The bottom 42" comprises a conical nose 94 and a surrounding cup member 95 which together form an annulus slidably surrounding coring mandrel 34". Nose 94 has limited slidable movement in the central recess 96 of member 95 and the outer periphery of member 95 is slidably engageable relative to the inside of mold box liner 86. Except during a pressing operation, the parts 94 and 95 have their uppermost surfaces in a horizontal plane under the influence of three headed biasing pins 97 spaced 120° apart around the vertical axis of the mold box. Each pin 97 is urged in an upward direction by a spring 98 in an axial recess 99 drilled in the wall of punch 41". The conical frustum portion on nose 94 makes an inverted dish shaped concavity 100 on the bottom of molded shape 43" similar to the inverted dish shaped boss 101 on the top thereof due to cavity 82, while the central passage 102 in shape 43" is caused by the presence of coring mandrel 34" during the molding operation.

Each biasing pin 97 extends upwardly through a drilled hole in an annular retainer plate 103 removably secured to the top of punch 41" by countersunk machine screws or other means. The inner periphery of plate 103 is threaded to engage and hold the threaded lower end of nose member 94. Member 94 is centrally drilled so that mandrel 34" is slidable therethrough, the lower end of the mandrel being threadably fixed to a stud 104, whereby it may be interchanged with a coring mandrel of another diameter should a change in the diameter of central opening 102 be desired, in which case another member 94 with a correspondingly sized opening would be used. A spacing sleeve 105 terminating in a flange 51" is utilized in cooperation with spring 50" to maintain coring mandrel 34" yieldably in its uppermost position relative to base 11", the height of coring mandrel 34" being adjustable by means of lock nuts 49" and the lower threaded portion 48" of a rod 106 which is affixed to coring mandrel 34" by stud 104. The lower end of rod 106 slidably passes through a bushing 107 in base member 11". The upper end of 47" of coring mandrel 34" is normally in alignment with the top surface of platen 22" in its uppermost position and end 47" is preferably semispherical to facilitate filling and passage of charging box 56" thereover.

In the course of an operation corresponding to that described hereinabove relative to the embodiment of FIGURES 1 to 4, inclusive, the further embodiment of FIGURES 7 to 13, inclusive, will mold the dry press shaped ware 43". The filling of mold cavity 27" will take place virtually instantaneously which in turn means that the charging box 56" with the granular material therein during a filling phase can advance to a position over cavity 27" and return in a matter of a very few seconds because the air will rush out through the vents 29", such air being air that otherwise would form a "slowdown cushion" in cavity 27" and air that would tend to be entrapped among the particles of the charged material. Moreover, the enlargement of the vents 29" immediately outwardly of the inner wall of liner 86 in the portions 30" and 30"a inhibit clogging thereof during filling and mold compaction, as does the relative dry condition of the material being molded and the distribution of relative movement between the top and bottom of the material being molded and the inner wall of the mold box 26", which moves in the course of molding as indicated in FIGURE 8. Upon return of the compacting plunger 19" to its upper position and the raising of punch 41" to eject the molded shape 43" as shown in FIGURE 9, the springs 98 will regain control and return cup 95 from its depressed condition during the actual molding operation as shown in FIGURE 8 to its flush condition as shown in FIGURE 9 whereby the molded ware piece 43" can simply be slid off platen 22" without injury to the bottom thereof around cavity 100, thereby immediately readying press 10" for a succeeding molding operation. It may be noted that if molded ware 43" is removed from platen 22" by hand or by means other than pushing it to one side by the use of feed slide box 56″ in the manner of the first-described embodiment, then each passage of box 56″ above mold cavity 27″ can be a charging operation, thus further speeding up the productive capacity of press 10″. Alternatively, such movement of each slide box 56″ above mold cavity 27″ can be a charging operation for the filling of mold box 26″ when box 56″ pushes the newly molded ware piece off to one side, as in the case of the first above-described embodiment, to actuate a switch which instantly drops the punch 41″ with its mold cavity bottom 42″ in a small fraction of a second against the stop means provided in the machine, thus allowing instantaneous filling to occur at that moment.

Various changes may be made in the illustrated embodiments and sequences of operations and other embodiments provided including ones with a plurality of mold boxes and associated means in side-by-side arrangement without departing from the spirit of my invention or the scope of the appended claims.

I claim:

1. Method of dry press molding of relatively dry particulate materials, comprising, in combination, dump charging relatively dry non-adherent particles of material to be molded into a molding cavity, driving air out of said cavity and from among said particles laterally outwardly from said cavity by said charging of said particles to shorten charging time and inhibit entrapment of air among said particles in said cavity, said driving occurring substantially simultaneously entirely around said cavity and substantially over the height thereof reached by said particles in the course of a charging operation, said driving further occurring solely to the atmosphere through openings located transversely of the general direction of movement of said particles and smaller than the majority particle size of the dry particulate material, and thereafter, vertically compressing said particles in said mold cavity to foreshorten the at rest height of said particles to make a substantially voidless molded shape having the shape of said cavity and of substantially uniform density throughout.

2. An apparatus for molding self-sustaining structures from substantially dry particulate materials by the application of pressure comprising a molding cavity defined by a mold box having an open top and bottom and laterally immobile vertical walls, the depth of the cavity being substantially greater than the width thereof, a vertically movable ejector member disposed below and movable into said cavity and having an area equal to the cavity dimension as defined by the vertical walls, said ejector defining the bottom of the cavity; presser head means disposed above the cavity and in vertical alignment therewith and including a pressing member movable into said cavity and having an area equal to that of the ejector, means for conveying and discharging particulate material into said mold box, said means including a supply hopper and a chamber movable laterally from a first position beneath the hopper to a second position over the cavity whereby particulate material defining the charge for the mold box is carried thereto for gravity feed into the cavity; the vertical walls of the mold box being provided with a plurality of vent apertures opening to atmospheric pressure, that portion of the aperture opening into the interior of the cavity having a cross sectional area smaller than the portion thereof opening to the outside of the cavity so as to prevent discharge of fines outwardly of the cavity during the filling and molding operation, yet permit egress of entrapped air in the charge during gravity filling of the cavity.

3. An apparatus as defined in claim 2, wherein said mold box is comprised of an outer case open at top and bottom and a liner disposed within the case, said vent apertures extending through the liner and said case, and means for retaining said liner in said case with the liner apertures in register with the case apertures.

4. An apparatus for molding self-sustaining structures from substantially dry particulate materials by the application of pressure comprising a vertically movable molding cavity defined by a mold box open at bottom and top and having a depth substantially greater than its width, an ejector member movable relative to the mold box and having an area defining the bottom of the cavity; a pressure head assembly having a presser head movable into the cavity and defining the top of the molding cavity, means including a charge transfer means movable over the top of the cavity for filling same by gravity discharge of particulate material into the cavity, core means centered within the cavity and movable therewith during pressing of the particulate material, to define with the mold box shaping surfaces for the molded article, at least one of said surfaces being provided with venting apertures open to atmosphere only, said apertures having a small cross sectional area opening inwardly toward the cavity whereby air may be exhausted therethrough during filling of the cavity while the escape of fines contained in the charge is prevented.

References Cited by the Examiner

UNITED STATES PATENTS

| | | | |
|---|---|---|---|
| 1,925,050 | 8/33 | Jagdmann et al. | 264—333 |
| 2,026,940 | 1/36 | Hendryx | 264—102 |
| 2,209,404 | 7/40 | Lassman | 25—27 |
| 2,218,196 | 10/40 | Hagar | 264—241 |
| 2,348,197 | 5/44 | Ernst et al. | 264—101 |
| 2,356,852 | 8/44 | Hutchinson | 264—72 |
| 2,522,298 | 9/50 | Ramsay | 264—27 |
| 2,527,537 | 9/59 | Fahlman | 22—93 |

ALEXANDER H. BRODMERKEL, *Primary Examiner.*

ROBERT F. WHITE, *Examiner.*